United States Patent
Guthery (10) Patent No.: US 6,308,270 B1
(45) Date of Patent: Oct. 23, 2001

(54) VALIDATING AND CERTIFYING EXECUTION OF A SOFTWARE PROGRAM WITH A SMART CARD

(75) Inventor: Scott B. Guthery, Belmont, MA (US)

(73) Assignee: Schlumberger Technologies, Inc., Austin, TX (US)

( * ) Notice: Subject to any disclaimer, the term of this patent is extended or adjusted under 35 U.S.C. 154(b) by 0 days.

(21) Appl. No.: 09/023,559

(22) Filed: Feb. 13, 1998

(51) Int. Cl.⁷ ..................................................... G06F 1/24
(52) U.S. Cl. ................................ 713/200; 717/4
(58) Field of Search ................................... 713/200, 201, 713/202; 380/3, 4, 23, 25; 705/43, 44, 18, 17, 16; 714/50, 51, 16, 38; 340/5.74; 717/4

(56) References Cited

U.S. PATENT DOCUMENTS

| | | |
|---|---|---|
| 3,977,785 | 8/1976 | Harris . |
| 4,168,396 | 9/1979 | Best . |
| 4,256,955 | 3/1981 | Giraud et al. ..................... 235/380 |

(List continued on next page.)

FOREIGN PATENT DOCUMENTS

| | | |
|---|---|---|
| 0 356 237 A2 | 2/1990 | (EP) . |
| 0 380 377 A1 | 8/1990 | (EP) . |
| 0 423 035 A1 | 4/1991 | (EP) . |
| 0 427 465 A2 | 5/1991 | (EP) . |
| 0 662 674 A1 | 7/1995 | (EP) . |
| 0 665 486 A2 | 8/1995 | (EP) . |
| 0 696 121 A1 | 2/1996 | (EP) . |
| 0 717 338 A1 | 6/1996 | (EP) . |
| 0 829 828 A1 | 3/1998 | (EP) . |
| 0889393 A2 | 1/1999 | (EP) . |
| 2 605 770 | 4/1988 | (FR) . |
| 2 667 171 | 3/1992 | (FR) . |
| 2 667 419 | 4/1992 | (FR) . |
| 2 701 133 | 8/1994 | (FR) . |
| 2 191 029 A | 12/1987 | (GB) . |
| 2 261 973 A | 6/1993 | (GB) . |
| 95207400 | 7/1995 | (JP) . |
| WO 96/25724 | 8/1996 | (WO) . |
| PCT/US 97/18999 | 10/1997 | (WO) . |
| WO 98/19237 | 5/1998 | (WO) . |

OTHER PUBLICATIONS

Wingfield et al., "News: Java Brews Trouble for Microsoft", www.javaworld.com/javaworld, Nov. 1995, pp. 1–2.

Blundon, "The Center of the Universe is a Database", www.javaworld.com/javaworld, Jul. 1996, pp. 1–5.

Gosling, "Audio/Video Sequence of Invited Presentations", www.5conf.inria.fr, May 1996, pp. 1–4.

Sandhu et al., "Authentication, Access Control, and Audit", ACM Computing Surveys, vol. 28, No. 1, Mar. 1996, pp. 241–243.

Cheng et al., "Securing the Internet Protocol", Proc. 5th USENIX UNIX Security Symposium, Salt Lake, Utah, 1995, p. 257.

(List continued on next page.)

*Primary Examiner*—William Grant
*Assistant Examiner*—Ronald D Hartman, Jr.
(74) *Attorney, Agent, or Firm*—Pehr B. Jansson; Danita J. M. Maseles (57) ABSTRACT

A smart card for use in connection with execution of a software program by a computer includes a microcontroller configured by a program stored in a smart card memory to verify information received from the computer during execution of the software program. The microcontroller is further configured to cause a signal to be stored in the smart card memory which is indicative of whether execution of the software program is certified as valid based on results of verifying the received information. Methods of using the smart card are also disclosed.

49 Claims, 6 Drawing Sheets

U.S. PATENT DOCUMENTS

| | | |
|---|---|---|
| 4,278,837 | 7/1981 | Best . |
| 4,453,093 * | 6/1984 | Boudreau ............................ 326/16 |
| 4,465,901 | 8/1984 | Best . |
| 4,562,306 | 12/1985 | Chou et al. . |
| 4,598,810 | 7/1986 | Shore et al. . |
| 4,634,807 | 1/1987 | Chorley et al. . |
| 4,650,975 | 3/1987 | Kitchener ........................... 235/375 |
| 4,683,532 * | 7/1987 | Yount et al. .......................... 714/38 |
| 4,688,169 | 8/1987 | Joshi . |
| 4,725,079 | 2/1988 | Koza et al. . |
| 4,748,561 | 5/1988 | Brown . |
| 4,777,355 | 10/1988 | Takahira . |
| 4,797,543 | 1/1989 | Watanabe ........................... 235/492 |
| 4,877,947 | 10/1989 | Mori .................................... 235/381 |
| 4,890,319 | 12/1989 | Seth-Smith et al. . |
| 4,890,321 | 12/1989 | Seth-Smith et al. . |
| 4,926,480 | 5/1990 | Chaum . |
| 4,937,740 * | 6/1990 | Agarwal et al. ..................... 364/200 |
| 5,064,999 | 11/1991 | Okamoto et al. .................... 235/379 |
| 5,068,894 | 11/1991 | Hoppe . |
| 5,123,045 | 6/1992 | Ostrovsky et al. . |
| 5,195,130 | 3/1993 | Weiss et al. .......................... 379/98 |
| 5,247,575 | 9/1993 | Sprague et al. . |
| 5,375,240 | 12/1994 | Grundy . |
| 5,386,369 * | 1/1995 | Christiano ...................... 364/464.01 |
| 5,406,380 | 4/1995 | Teter .................................... 358/332 |
| 5,412,191 | 5/1995 | Baitz et al. . |
| 5,420,405 | 5/1995 | Chasek . |
| 5,440,631 | 8/1995 | Akiyama et al. . |
| 5,444,779 | 8/1995 | Daniele . |
| 5,448,045 * | 9/1995 | Clark .................................... 235/382 |
| 5,461,217 | 10/1995 | Claus . |
| 5,500,517 | 3/1996 | Cagliostro .......................... 235/486 |
| 5,509,070 | 4/1996 | Schull . |
| 5,528,753 * | 6/1996 | Fortin .................................... 714/35 |
| 5,530,520 | 6/1996 | Clearwater . |
| 5,532,920 | 7/1996 | Hartrick et al. . |
| 5,537,474 | 7/1996 | Brown et al. ......................... 380/23 |
| 5,544,086 | 8/1996 | Davis et al. ......................... 364/408 |
| 5,550,919 | 8/1996 | Kowalski ............................... 380/23 |
| 5,590,197 | 12/1996 | Chen et al. ............................ 380/24 |
| 5,604,802 | 2/1997 | Holloway .............................. 380/24 |
| 5,613,012 | 3/1997 | Hoffman et al. .................... 382/115 |
| 5,650,761 | 7/1997 | Gomm et al. ........................ 235/381 |
| 5,651,111 * | 7/1997 | McKeeman et al. .................. 714/38 |
| 5,689,565 | 11/1997 | Spies et al. ............................ 380/25 |
| 5,692,132 | 11/1997 | Hogan ................................. 395/227 |
| 5,724,425 | 3/1998 | Chang ................................... 380/25 |
| 5,734,150 | 3/1998 | Brown et al. ....................... 235/381 |
| 5,742,756 | 4/1998 | Dillaway et al. .................... 395/186 |
| 5,748,878 * | 5/1998 | Rees et al. ............................ 714/38 |
| 5,761,306 | 6/1998 | Lewis .................................... 380/21 |
| 5,768,419 | 6/1998 | Gundlach et al. .............. 395/187.01 |
| 5,811,771 | 9/1998 | Dethloff .............................. 235/380 |
| 5,815,657 | 9/1998 | Williams et al. .................... 395/186 |
| 5,822,517 * | 10/1998 | Dotan .................................. 395/186 |
| 5,835,864 | 11/1999 | Diehl ................................... 455/602 |
| 5,841,866 | 11/1998 | Bruwer et al. ........................ 380/23 |
| 5,844,218 | 12/1998 | Kawan et al. ....................... 235/380 |
| 5,844,497 | 12/1998 | Gray ............................... 340/825.34 |
| 5,854,891 | 12/1998 | Postlewaite ..................... 395/188.01 |
| 5,872,909 * | 2/1999 | Wilner et al. .......................... 714/38 |
| 5,889,941 | 3/1999 | Tushie et al. ........................ 395/186 |
| 5,892,902 * | 4/1999 | Clark ............................... 395/187.01 |
| 5,901,303 * | 5/1999 | Chew .................................. 395/400 |
| 5,915,226 | 6/1999 | Martineau ........................... 455/558 |
| 5,923,884 | 7/1999 | Peyret et al. ........................ 395/712 |
| 5,937,068 * | 8/1999 | Audebert ............................... 380/23 |
| 5,948,112 * | 9/1999 | Shimada et al. ....................... 714/16 |
| 5,991,402 | 11/1999 | Jia ........................................... 380/9 |
| 6,023,508 | 2/2000 | Bombard ............................... 380/24 |
| 6,087,955 * | 7/2000 | Gray .................................... 340/5.74 |
| 6,145,122 * | 11/2000 | Miller et al. ............................ 717/4 |
| 6,161,200 * | 12/2000 | Rees et al. ............................. 714/38 |
| 6,167,535 * | 12/2000 | Foote et al. ........................... 714/38 |

OTHER PUBLICATIONS

Kung et al., "Developing an Object–Oriented Software Testing and Maintainance Environment", Communications of the ACM, vol. 38, No. 10, Oct. 1995, pp. 75–87.

Federal Information Processing Standards Publication 190, "Announcing The Guideline For The Use Of Advanced Authentication Technology Alternatives", Sep. 28, 1994.

Oded Goldreich and Rafail Ostrovsky, "Software Protection and Simulation on Oblivious RAMs", Journal of the ACM, vol. 43, No. 3, May 1996, pp. 431–473.

Trent Jaeger and Aviel D. Rubin, "Protocols for Authenticated Download to Mobile Information Applicances", The University of Michigan, Dept. of Electrical Engineering & Computer Science, Dec. 1995.

Stephen T. Kent, "Protecting Externally Supplied Software in Small Computers", Massachusetts Institute of Technology, Sep. 1980, pp. 2–8, 12–39, 67–76 and 212–236.

R. Mori and M. Kawahara, "Superdistribution: The Concept and the Architecture", The Transactions of the IEICE, vol. E73, No. 7, Jul. 1990, pp. 1133–1146.

John Kelsey and Bruce Schneier, "Authenticating Outputs of Computer Software Using a Cryptographic Coprocessor", Proceedings of CARDIS '96, Amsterdam (1996).

Bruno Struif, "The Use of Chipcards for Electronic Signatures and Encryption", IEEE Proceedings of the VLSI and Computer Peripherals Conference, May 1989, pp. 4–155—4–158.

0 427 465 A3—Examiner's search report for 0 427 465 A2 May 15, 1991.

0 356 237 A3—Examiner's search report for 0 356 237 A2 Feb. 28, 1990.

PCT International Search Report dated Mar. 15, 1999.

"Microsoft Authenticode", Microsoft Corporation (Internet 2/97).

"McAfee Network Security & Management", McAfee Associates Inc. (Internet 2/97).

"SoftLock Services' Home Page", SoftLock Services, Inc. (Internet 2/97).

"WIBU Systems Copy Protection", WIBU–Systems AG (Internet 2/97).

"WIBU Systems Copy Protection", WIBU–Systems AG, Internet home page (www.wibu.de), 1 page.

"Microsoft Authenticode", Microsoft Corporation, (www-.microsoft.com/ie/ie3/trustsoft.html), 1 page.

"McAfee Network Security & Management", McAfee Associates, Inc., (www.mcafee.com/main.html), 2 pages.

"SoftLock Services', Home Page", SoftLock Services, Inc., (www.awa.com/softlock/s/home.html), 1 page.

"NetChex", NetI, Inc., Home Page.

"Mondex International", Mondex International Limited, Home Page.

"Electronic Payment Schemes", Dr. Phillip M. Hallam–Baker, World Wide Web Consortium.

"DigiCash", DigiCash bv, Home Page.

"CyberCash", CyberCash, Inc., Home Page.

Phillip M. Hallam–Baker, "Micro Payment Transfer Protocol (MPTP) Version 0.1", W3C Working Draft, Nov. 22, 1995.

"Secure Electronic Transaction (SET) Specification", Book 2: Technical Specifications, Draft for Public Comment, Feb. 23, 1996, pp. 1–10, 129–186.

Blaze, M., "High–Bandwidth Encryption with Low–Bandwidth Smartcards", in *Fast Software Encryption: Third Int'l. Workshop* (ed. D. Gollman), Feb. 1996.

"The Copyright Website" Home Page.

"Intellectual Property: The Property of the Mind", The Economist, Jul. 27, 1996, pp. 57–59.

Lehman, B., "Intellectual Property & the Nat'l. Information Infrastructure", U.S. Patent and Trademark Office, Sep. 1995, pp. 177–200.

"CCC Online", Copyright Clearance Center, Inc.

"IBM Cryptolope Containers", IBM ifoMarket, International Business Machines Corporation.

"IBM infoMarket Rights Management Overview", IBM InfoMarket, International Business Machines Corporation.

* cited by examiner

VALIDATING AND CERTIFYING EXECUTION OF A SOFTWARE PROGRAM WITH A SMART CARD

BACKGROUND OF THE INVENTION

The invention relates generally to validating and certifying execution of a software program with a smart card.

The proliferation of computers, including the personal computer, has allowed a wide variety of tasks and functions to be performed more efficiently and quickly. In addition, computers have provided a new mode for providing entertainment, for example, in the gaming industry, where it is occasionally desirable to validate results obtained by a consumer. The continued reliance on computer systems depends, in part, on the ability of persons using such systems to be assured that software programs being executed by the computer are, in fact, producing reliable results. This requires, among other things, that persons who wish to rely on results generated by a computer executing particular software are assured that the software has not been altered in an unauthorized manner. Situations can arise in which a software program has been altered or modified in an unauthorized manner, yet the alteration or modification may not always be capable of being easily detection by the user of the program. Such unauthorized alterations can result, for example, in the program's producing erroneous results. It may also allow unauthorized persons to use the software or may cause damage to the local computing environment. Moreover, such modifications of the computer program may result in proprietary information being sent to unauthorized third parties.

SUMMARY OF THE INVENTION

In general, in one aspect, the invention features a method of validating execution of a software program. The method includes executing the software program on a computer, sending information from the computer to a smart card during execution of the software program, verifying in the smart card information received from the computer, and storing a signal in the smart card indicative of whether execution of the software program is certified as valid.

In another aspect, the method of validating execution of a software program includes executing the software program on a computer, verifying in a smart card information received from the computer during execution of the software program, and generating a signal in the smart card indicative of whether execution of the software program is certified as valid.

In yet a further aspect, the invention features a smart card for use in connection with execution of a software program by a computer. The smart card includes communication circuitry for receiving information from a location external to the smart card and for transmitting information from the smart card to the external location. The smart card further includes a memory which stores data and a smart card program. In addition, the smart card includes a microcontroller configured by the smart card program to verify information received from the computer during execution of the software program and to cause a signal to be stored in the memory. The signal is indicative of whether execution of the software program is certified as valid based on results of verifying the received information.

The invention also includes a software package including a computer readable medium, which stores a software program for execution by a computer, and a smart card, such as the smart card described above and discussed in greater detail below.

Various implementations of the invention include one or more of the following features. Different types of information can be sent to the smart card. The information can include, for example, an identifier indicative of a point in the software program at which the information was sent to the smart card, information indicative of the current state of the software program, or the current value of a variable used in the software program. The smart card can perform one or more verification tests in response to the information received from the computer. For example, the smart card can check whether the identifier is correct, whether the current value of the variable is accurate, or whether the current value of the variable falls within a prescribed range. The information sent by the computer can also identify memory addresses in the computer in which specified data is stored, and the smart card can verify whether the memory addresses are permissible memory locations for the specified data.

One or more control values can be sent from the smart card to the computer in response to verifying the information received from the computer. A control value can be used to determine when subsequent information will be sent from the computer to the smart card during execution of the software program. The smart card can determine whether the software program responds correctly to the one or more control values. The frequency with which the computer sends information to the smart card can depend upon the control values. The smart card can also verify that the order in which information is received from the computer is correct.

In various implementations, the smart card can determine whether the frequency with which routines in the software program are called is within acceptable ranges. Similarly, the smart card can determine whether a duration of time between successive calls to the smart card by the computer during execution of the software program is within acceptable ranges.

The smart card can store or generate a signal indicating that execution of the software program is certified as valid or indicating that the software program was not altered in an unauthorized manner prior to or during its execution. The signal can be stored or generated after completion of the software program. In certain implementations, such a signal is stored only if all of the verification tests are satisfied. The signal indicative of whether execution of the software program is certified as valid can be retrieved from the smart card. Additionally, the microcontroller can be configured to cause a signal indicative of whether execution of the software program is certified as valid to be generated in response to a query generated externally to the smart card.

The microcontroller in the smart card can be suitably configured to perform the various functions so as to provide, in response to the proper execution of the program by the computer, a signal which indicates that execution of the software program is certified as valid or which indicates that the software program was not altered in an unauthorized manner prior to or during execution of the software program.

In an additional aspect, the invention includes a method of tracking the amount of usage of a software program executed by a computer. The method includes executing the software program on a computer, sending information from the computer to a smart card during execution of the software program, and storing information in the smart card indicative of the number of times the software program has been executed. The smart card can also store information indicative of the frequency with which various software routines were called during execution of the software program.

In various implementations, the invention provides one or more of the following advantages. The invention makes it easier to detect whether any unauthorized modifications to or tampering of the software program being executed by the computer has occurred. The invention can also provide a technique for validating and certifying the accuracy of results obtained by the software program. Such detection can be performed in a relatively low cost and secure manner.

In some implementations, the smart card can be used to vary the extent of its probe of the computer program in response to information previously received from the computer during execution of the program. Thus, the smart card can tailor the probe and subsequent validation tests to provide a tamper resistant, yet efficient, technique for executing a computer program.

The invention can also provide a technique for tracking the amount of use of a particular computer program. This tracking or metering can be used, for example, to charge consumers for their usage of the computer program on a per-use basis.

Additional features and advantages will be readily apparent from the following detailed description, accompanying drawings and claims.

DESCRIPTION OF THE PREFERRED EMBODIMENTS

Figure 1:
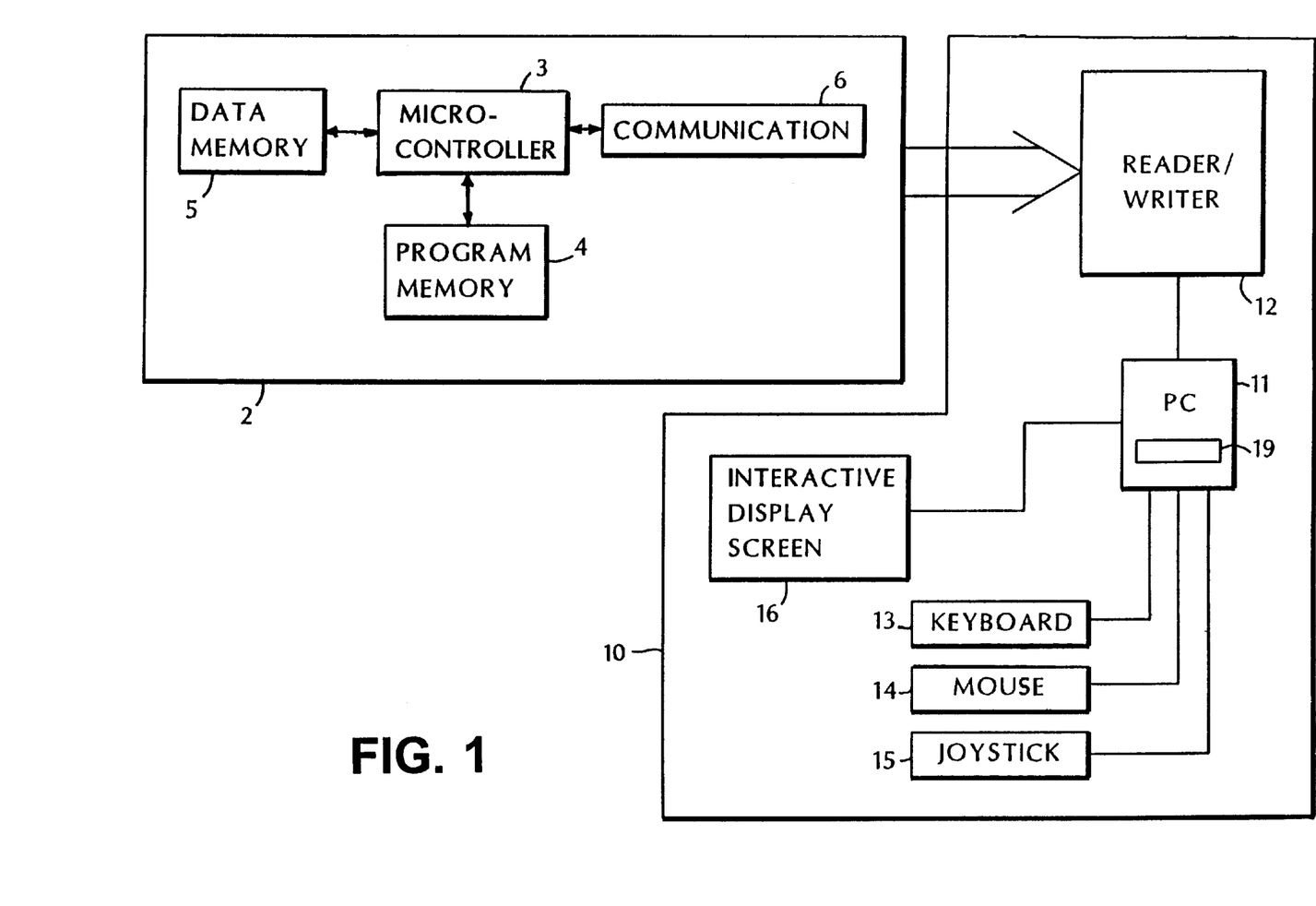
FIG. 1 is an exemplary system in which the invention can be practiced.

FIG. 1 shows an exemplary system which includes a smart card 2. Smart cards, also known as microprocessor cards or chip-cards, are plastic cards approximately the size of a credit card embedded with an integrated circuit (IC) chip. The chip stores information while protecting it from unauthorized access. As shown in FIG. 1, the smart card 2 includes a microcontroller 3. Software which controls the operations of the smart card 2 is stored in program memory 4 such as nonvolatile read-only memory (ROM). The microcontroller 3 is appropriately configured by the program residing in the program memory 4 to perform the various smart card functions described below. Data is stored in a data memory 5. In the smart card 2 shown in FIG. 1, the data memory 5 includes an alterable nonvolatile memory, such as electrically erasable programmable read-only memory (EEPROM). The data memory 5 also includes random access memory (RAM).

The system 1 further includes a terminal 10. The terminal 10 includes a computer or other processor, such as a personal computer 11, which can execute, for example, a software program installed in the computer 11. A smart card reader or reader/writer 12 is attached to and communicates with the computer 11. The terminal 10 also includes a device for a user to interact with the software program during its execution. Such a device can include, for example, one or more of the following: a keyboard 13, a mouse 14, a joystick 15, an interactive display screen 16, or other devices which allow a person using the program to provide appropriate input data or input signals to the computer 11.

The smart card 2 also has a device for communicating 6 with the smart card reader or reader/writer 12. In certain implementations, the device for communicating 6 is electrical circuitry which requires physical contact with pins in the smart card reader/writer 12. Alternatively, electrical circuitry on the smart card 2 can use inductive coupling, capacitive coupling or radio signals to communicate with the reader/writer 12. Communication may be performed by a local area or wide area network, for example, by way of the Internet or by a satellite communication link.

The smart card 2 is issued by a particular vendor and is intended to be used in conjunction with a computer software program from the particular vendor. In one exemplary situation, the smart card 2 would be purchased as part of a software package including computer software stored on a computer-readable medium, such as a magnetic diskette. The computer-readable medium can be inserted into a drive 19 in the computer 11 which is capable of reading and executing the software residing on the computer-readable medium. In other situations, the software program can be permanently stored in computer memory, such as read-only-memory (ROM). In still other situations, the smart card reader or reader/writer 12 is at a different location from the computer 11 and communicates with the computer 11 by a local area or wide area network, for example, by the Internet, satellite communication links or another suitable communication means.

In general, when a person wishes to use the software program on the computer, the smart card must be inserted in the reader/writer 12. The computer 11 then provides information or other data to the smart card 2 at selected points during execution of the software program. In certain implementations, the computer 11 also receives information, data or instructions from the smart card 2. The information, data or instructions generated by the smart card 2 can take various forms, including, for example, control values. Based upon the information or data provided to the smart card 2, the smart card can determine whether anyone has improperly altered or tampered with the program being executed by the computer 11. The smart card 2 can thus determine the validity of the results generated by the program and can certify the results as valid.

FIGS. 2–3, 4A and 4B are flow charts showing various implementations of a method of validating the execution of a particular software program according to the invention. As shown by 100 in FIG. 2, the computer 11 begins to execute the particular software program. Execution of the program can begin, for example, when the computer 11 is powered up, when the user strikes a key on the keyboard 13, or when some other triggering signal is received by the computer 11. As indicated by 102, the software program instructs the computer to send certain information to the smart card 2 at a specified point during the program's execution. This information can include, for example, an identifier indicating the point or line in the program which is executing the contact to the smart card as well as information regarding the current state of the program. The information regarding the current state of the program can include, for example, the present value of a particular variable used in the program. This information is sent to the smart card 2 which verifies the received information, for example, as accurate or within a prescribed range, as indicated by 104. The computer completes execution of the program, as indicated by 106. If the information received by the smart card 2 is verified, then the smart card 2 certifies, for example, that the executed program was not tampered with or altered, as indicated by 108.

Figure 2:
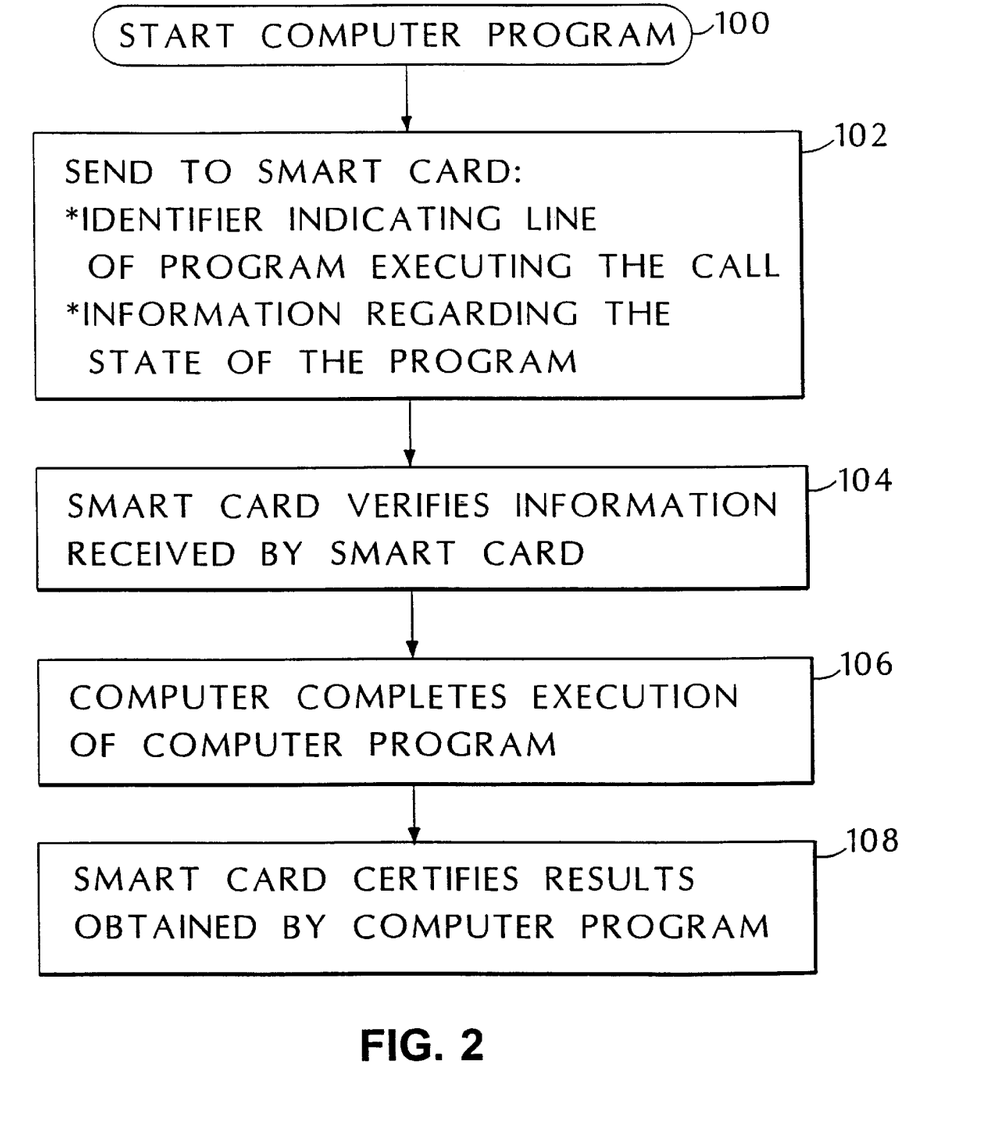
FIG. 2 is a flow chart illustrating a method according to one implementation of the invention.

In certain implementations, the certification would be provided by the smart card 2 only in response to a query from another party, such as the vendor of the software, having access to the certification results stored in the smart card 2. For example, a separate program, not available to the purchaser of the software package, can be required to access the validation results in the smart card 2. Thus, validation and certification data and programs should be stored in a secure manner on the smart card 2. In some applications, this may involve the use of special passwords, as well as known data encryption techniques.

Figure 3:
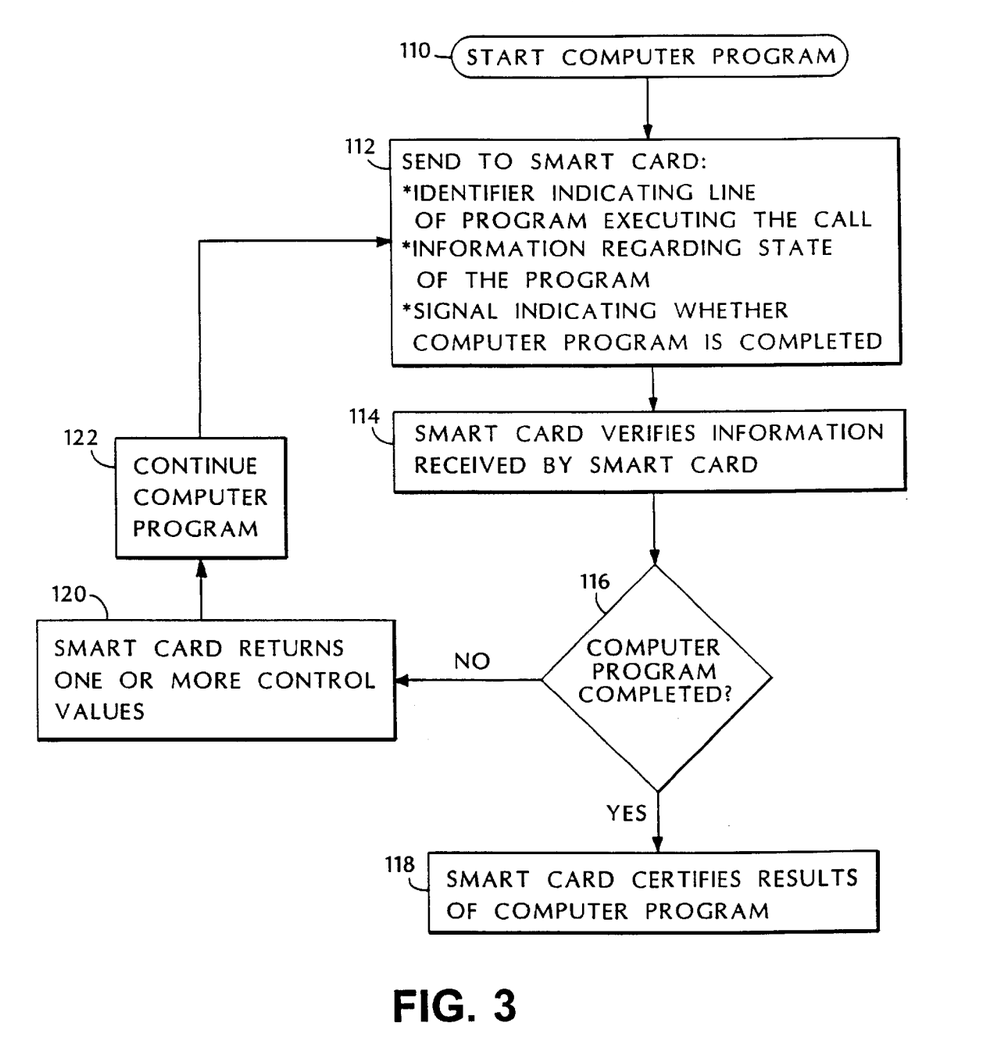
FIG. 3 is a flow chart illustrating a method according to another implementation of the invention.

FIG. 3 is a flow chart of another implementation of a method of validating the proper execution of a particular .software program according to the invention. As shown by 110, the computer 11 begins to execute the particular software program. As indicated by 112, the software program instructs the computer to send certain information to the smart card 2 at a specified point during the program's execution. This information can include, for example, an identifier indicating the point or line in the program which is executing the contact to the smart card as well as information regarding the current state of the program. The information regarding the state of the program can include, for example, the value of specified variables used in the program being executed by the computer 11. The information sent by the computer 11 to the smart card 2 can also include a signal indicating whether the computer program has been completed. In response to the information sent by the computer 11, the smart card 2 verifies the information received from the computer 11, as indicated by 114. Various types of verifications can be performed, including checking whether received values are accurate or within expected ranges. The microcontroller 3 in the smart card 2 can also be configured to check whether the computer 11 sent information to the smart card 2 at the appropriate points or lines during the computer's execution of the program.

The smart card 2 determines whether execution of the program by the computer 2 has been completed, as indicated by 116. If the computer 2 has completed its execution of the program, and the verification test or tests performed in 114 were satisfied, then the smart card 2 certifies, for example, that the executed program was not tampered with or altered, as indicated by 118.

Returning to 116, if the computer 2 has not completed its execution of the program, the smart card 2 returns one or more control values to the computer 11, as indicated by 120. In some implementations, for example, the control values are used by the software program being executed in the computer 11 to determine when the computer 11 should next send information to the smart card 2. The computer 11 continues to execute the program, as indicated by 122. At the appropriate point during the continued execution of the program, the computer 11 again sends information to the smart card 2 (112). The additional information can also include an identifier indicating the point or line in the program which is executing the contact to the smart card 2 as well as information regarding the current state of the program. The additional information can be the same or different from the information previously sent to the smart card 2 depending on the details of the software program being executed by the computer 11 and any control values that may previously have been returned by the smart card 2. The smart card 2 verifies the received information (116). This cycle continues until execution of the program by the computer 11 is completed.

If the one or more verification tests performed by the smart card 2 are satisfied, then the smart card 2 certifies, for example, that the executed program was not tampered with or altered, as indicated by 118. If, on the other hand, any verification test is not satisfied, then the smart card 2 is programmed to generate and send a signal to the computer instructing the computer 11 to interrupt and terminate execution of the software program. Moreover, the smart card 2 will not certify that the program executed by the computer 11 was not tampered with or altered.

Figure 4A:
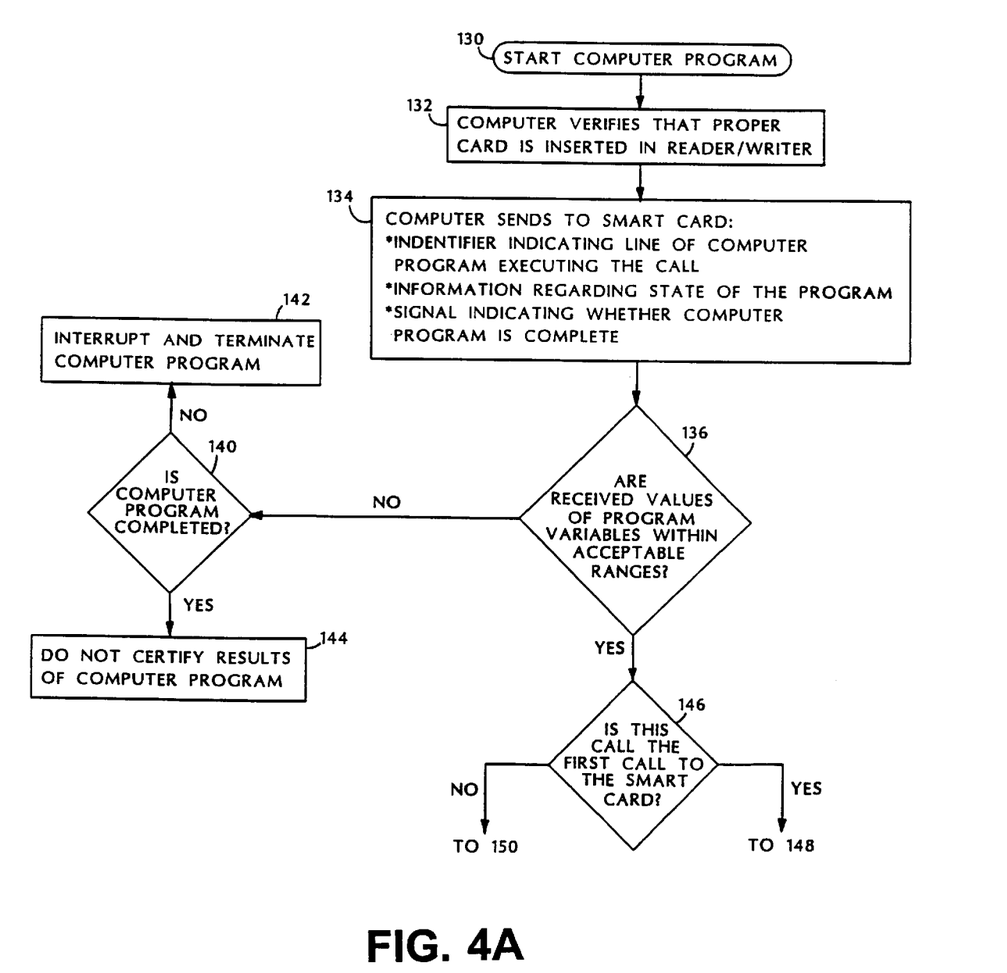
FIGS. 4A–4B are a flow chart illustrating a method according to a further implementation of the invention.
Figure 4B:
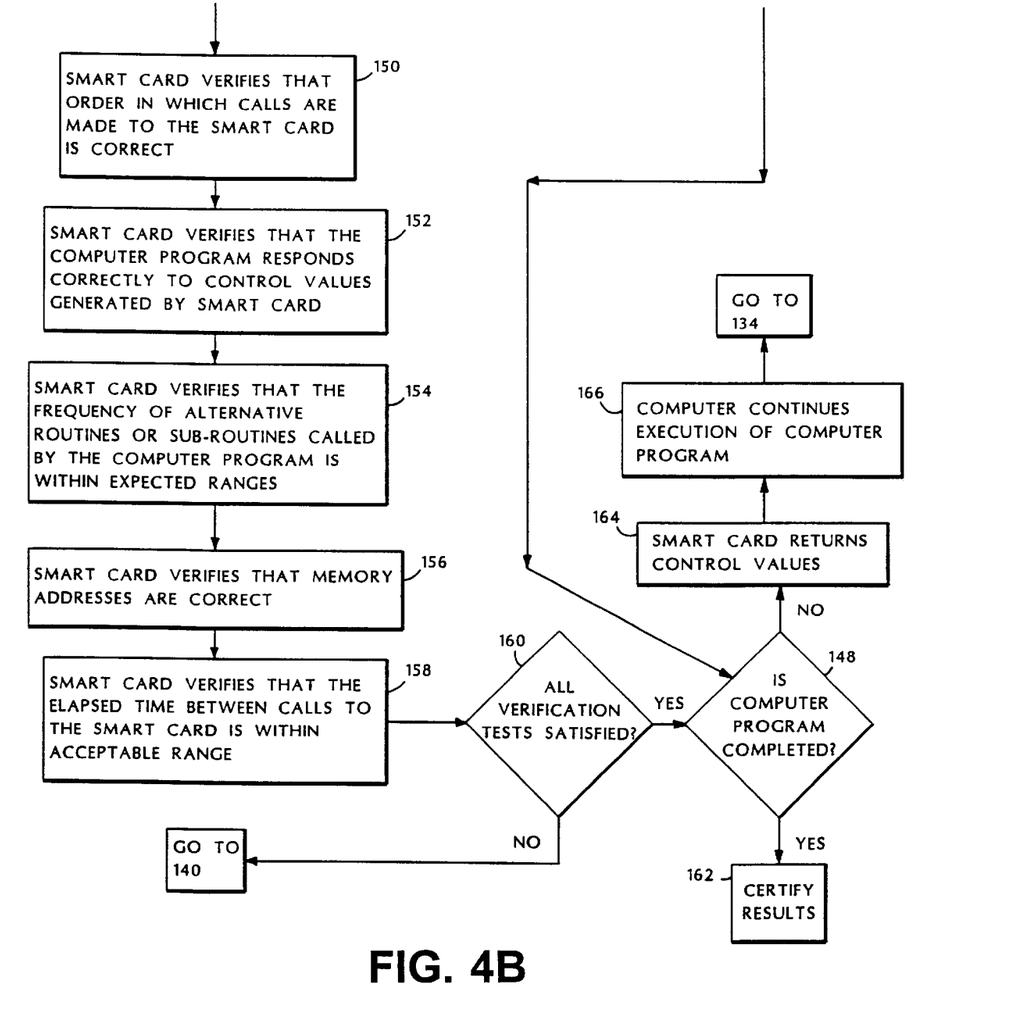

FIGS. 4A and 4B are a flow chart showing yet a further implementation of the invention. As shown by 130, the computer 11 begins to execute the particular software program. The software program instructs the computer 11 to verify that the proper smart card is inserted in the smart card reader/writer 12, as indicated by 132. In one implementation, for example, the smart card 2 can include a unique identifier stored in the data memory 5 which is used by the computer 11 to verify the identity of the smart card 2. Assuming the proper smart card is inserted in the reader/writer 12, the computer 11 sends certain information to the smart card 2 at a specified point during the program's execution, as indicated by 134. Again, this information can include, for example, an identifier indicating the point or line in the program which is executing the call to the smart card as well as information regarding the current state of the program. The information regarding the current state of the program can include, for example, the values of one or more specified program variables as well as a signal indicating whether execution of the software program has been completed. In various implementations, the information regarding the state of the program can also identify the memory addresses in which specified data is stored in the computer 11.

As indicated by 136, in response to the information received by the smart card 2, the smart card 2 verifies whether the received values of program variables are within acceptable ranges of expected values. If the received values are not verified, then, as indicated by 140, the smart card determines whether the computer 11 has completed execution of the software program. If the computer 11 has not completed execution of the program, then the smart card generates a signal which it sends to the computer 11 instructing the computer 11 to interrupt and terminate the program, as indicated by 142. On the other hand, if the computer 11 has completed executing the program, then, as indicated by 144, the smart card 2 stores a retrievable data signal or electronic flag in its memory 5 indicating that the results of the executed program are not certified as true, accurate or otherwise reliable.

If, in 136, the smart card 2 verifies that the received values are within acceptable ranges, then, as indicated by 146, the smart card 2 determines whether the received information represents the first call by the computer 11 to the smart card 2. If this present call is the first call to the smart card 2, then the smart card determines whether execution of the software program by the computer 11 is completed, as indicated by 148. The determination of whether execution of the program is completed can be based, for example, on the signal sent by the computer 11 in 134. If execution of the program by the computer 11 is completed, then, as indicated by 162, the smart card 2 stores a retrievable data signal or flag in its memory 5 indicating that the results of the executed program are certified as true, accurate or otherwise reliable. If execution of the program by the computer 11 is not completed, then the smart card 2 returns one or more control values to the computer 11, as indicated by 164. Again, in certain implementations, the control values can instruct the computer at what subsequent point or line in the program the computer should next send information to the smart card 2. The computer 11 continues to execute the program, as indicated by 166. At the appropriate point during the continued execution of the program, the computer 11 again sends additional information to the smart card 2, as indicated by 134.

Returning to 146, if the smart card 2 determines that the present call to the smart card is not the first call to the smart card during the present execution of the program, then, in various implementations, the smart card 2 can perform one or more of the following additional . verification checks. As indicated by 150, the smart card 2 can verify whether the order in which calls have been made to the smart card is correct. The smart card 2 can also verify whether the software program executed by the computer 11 responds correctly to the control values generated by the smart card, as indicated by 152. In addition, the smart card 2 can verify whether the frequency with which alternative routines in the software program are called is within acceptable ranges, as indicated by 154. This feature can be useful, for example, when the execution history of the software program on the computer 11 is determined by a random number such as in various software programs in the game industry. Furthermore, as indicated by 156, the smart card 2 can verify whether the memory addresses of particular data values or computer instructions are correct or, alternatively, whether the memory addresses are permissible memory locations for the particular data. The smart card 2 can also verify whether the elapsed time between calls to the smart card 2 is within an expected range of values given the input data, as indicated by 158.

The smart card 2 determines whether each of the additional verification tests performed in 150 through 158 is satisfied, as indicated by 160. If any of the verification tests is not satisfied, then the smart card program returns to 140. The smart card 2 either generates a signal instructing the computer 11 to interrupt and terminate the program being executed by the computer 11 (142), or, if the program running on the computer 11 has already been completed, the smart card 2 stores a retrievable data signal or flag in its memory 5 indicating that the results of the executed program are not certified as true, accurate or otherwise reliable (144).

Returning to 160, if all the verification tests performed in 150 through 158 are satisfied, then the program in the smart card 2 returns to 148 by which the smart card 2 determines whether the program being executed by the computer 11 has been completed. As previously discussed, the determination of whether execution of the computer program is completed can be based, for example, on the signal sent by the computer 11 in 134. Depending on whether the computer 11 has completed executing the program, the smart card 2 either stores a retrievable data signal or flag in its memory 5 indicating that the results of the executed program are certified as true, accurate or otherwise reliable (162) or returns one or more control values to the computer 11 (164) to allow the computer 11 to continue execution of the program.

Figure 5:
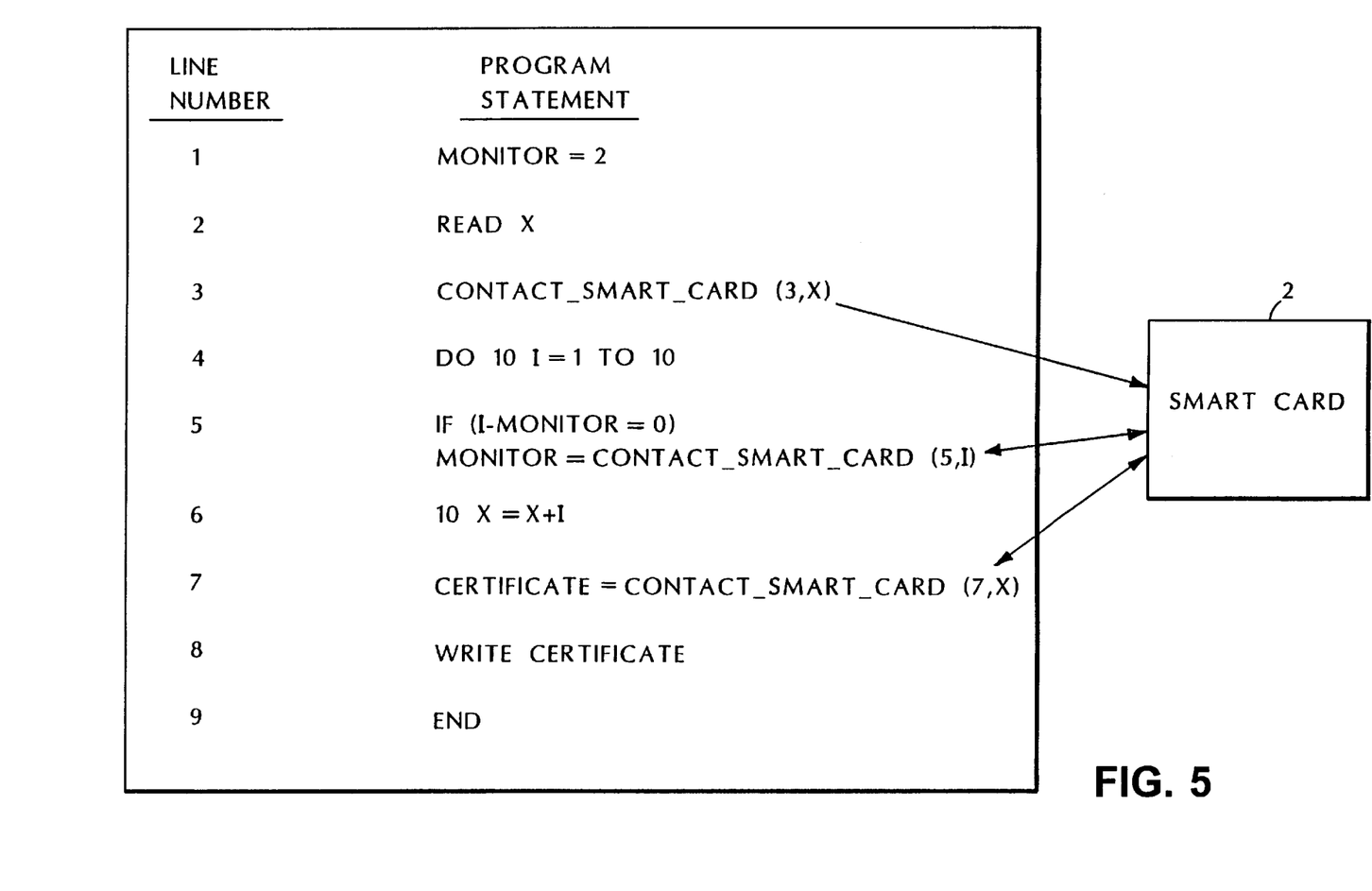
FIG. 5 shows an exemplary computer program whose execution can be certified by a smart card according to the invention.

FIG. 5 illustrates an exemplary software program that, according to one implementation of the invention, can be executed by the computer 11 in conjunction with the smart card 2 to validate and certify any results generated by the computer 11. The software program of FIG. 5 is intended to illustrate various features and advantages of the invention and is exemplary only. It is not, however, intended to limit the scope of the invention.

In FIG. 5, MONITOR is a control variable whose value can be changed by the smart card 2 at certain points during execution of the program. CONTACT_SMART_CARD instructs the computer 11 to generate a call to the smart card 2 and to send it specific information. The first argument of the call CONTACT_SMART-CARD identifies to the smart card 2 which call it is receiving. In this example, the corresponding line number of the program which generates the call to the smart card is used.

In line 1 of the program, the control variable MONITOR is initially set to two. In line 2, the program instructs the computer 11 to read or retrieve the value of a variable X from computer memory. In line 3, the computer 11 is instructed to send the current value of X to the smart card. In this line of the program, the first argument in the call indicates to the smart card 2 that the information it is receiving is from line 3 of the program.

Line 4 of the program shown in FIG. 5 instructs the computer 11 to perform the next two lines of the program for the variable I, where I takes on each of the values one through ten, successively. In line 5, if the current value of the variable I minus the current value of MONITOR equals zero, then the computer 11 is instructed to make another call to the smart card 2 and to send the current value of I to the smart card. In the illustrated example, the first call in line 5 of the program would occur when I equals two. In response, the smart card 2 returns a value for the control variable MONITOR which can be the same or different from the initial value of the variable MONITOR. For purposes of illustration, it will be assumed that the smart card 2 returns a value of eight for the variable MONITOR in response to the first call in line 5.

In line 6 of the program shown in FIG. 5, a new value for the variable X is calculated and set equal to the previous value of X plus the current value of the variable I. The program will continue to increment the value of I and to calculate corresponding new values of X. No additional calls will be made to the smart card 2 until the variable I equals eight. When I is set to eight in line 4 of the program, the computer 11 makes another call to the smart card 2 in line 5 of the program. Assuming, for example, that the smart card 2 does not modify the value of the control variable MONITOR in response to this call, then the program will continue to increment the value of I and to calculate the corresponding new values of X until the value of the variable I is set to ten, and a final value of the variable X is obtained in line 6 of the program.

In line 7 of the program shown in FIG. 5, the computer 11 is instructed to make yet another call to the smart card 2 and to send the smart card the current value of the variable X. In response, the smart card 2 returns, for example, encrypted data representing a certification that execution of the program by the computer 11 was not improperly altered if various verification tests by the smart card were satisfied. The verification tests which the smart card 2 can perform include the various types of verification tests discussed above. For example, the smart card 2 would verify that the computer 11 executed calls to the smart card 2 in the proper order. Similarly, the smart card 2 would verify that received values of the variables X and I were correct. In addition, the smart card 2 can probe the computer program to determine whether it responds the way the smart card 2 expects it to respond based on the values of the control variable MONITOR returned to the computer 11.

In line 8 of the computer program in FIG. 5, the program writes the encrypted certification data to memory. The encrypted certification data can be retrieved and decrypted at a later time by a party holding the proper decryption key. The computer program of FIG. 5 ends in line 10.

In some implementations, the smart card 2 is configured by a program in the memory 4 to vary the values of the control variable depending on the results of the verification tests. For example, various verification tests can be designed to indicate whether received values are reasonable given the input values or whether the received values fall within acceptable limits. The results of such tests may indicate to the smart card 2 that a more careful probing of the execution of the computer program is necessary before providing certification. In such circumstances, the smart card 2 would modify the control values to probe the execution of the program more frequently. Thus, with respect to the program in FIG. 5, the smart card 2 would, for example, return values of the control variable such that each time line 5 of the program was executed with the variable I equal to or greater than two, the current value of I would be sent to the smart card 2. In general, it is desirable to limit the number of times the smart card 2 is called so as to maintain a fast execution time for the computer program. On the other hand, the more frequently the computer program calls the smart card 2 and sends it information, the more reliable the certification will be. The frequency with which the computer program calls the smart card 2 can be tailored to the particular requirements of the application.

To further increase the likelihood that unauthorized tampering or alteration of the computer program will be detected, all information sent between the computer 11 and the smart card 2 can be encrypted according to known techniques.

Additionally, in certain implementations, the microcontroller 3 can be configured by a program in the smart card memory 4 to keep track of the number of times the software program is executed by the computer 11 or the frequency with which various routines in the program are called based on information sent to the smart card 2 while the program is being executed. Such data can be stored in the smart card memory 5 and subsequently retrieved to-meter the usage of the computer program. Such metering would allow the vendor of the software, for example, to charge consumers on a per-use basis, rather than a flat fee for purchase of the software.

Other implementations are contemplated within the scope of the following claims.

What is claimed is:

1. A method of validating execution of a software program comprising:

executing the software program on a computer;

sending information from the computer to a smart card during execution of the software program including sending an identifier indicative of a point in the software program at which the information was sent to the smart card;

verifying in the smart card that the information received from the computer satisfies a criteria indicative of the validity of the software program; and storing a signal in the smart card indicative of whether execution of the software program is certified as valid.

2. The method of claim 1 of validating execution of a software program further comprising:

if the software program has not finished executing and if the criteria indicative of the validity of the software program is not satisfied, sending a signal from the smart card to cause terminating the execution of the software program.

3. The method of claim 1 wherein verifying comprises checking whether the identifier is correct.

4. The method of claim 1 wherein the software program is in a current state, and wherein sending information comprises sending information indicative of the current state of the software program.

5. The method of claim 4 wherein the software program comprises a variable having a current value, and wherein sending information comprises sending the current value of the variable to the smart card.

6. The method of claim 5 wherein verifying comprises checking whether the current value of the variable is accurate.

7. The method of claim 5 wherein verifying comprises checking whether the current value of the variable falls within a prescribed range.

8. The method of claim 1 wherein storing a signal comprises storing a signal indicating that the software program was not altered in an unauthorized manner prior to or during its execution.

9. A method of validating execution of a software program comprising:

executing the software program on a computer;

sending a value for a specified variable from the computer to a smart card during execution of the software program;

verifying in the smart card that the value received from the computer is accurate or within an expected range;

sending a control value from the smart card to the computer in response to verifying the information received from the computer and indicative of whether the software program is valid or invalid;

continuing execution of the software program if the control value indicates that the software program is valid.

10. The method of claim 9 wherein the control value determines when subsequent information will be sent from the computer to the smart card during execution of the software program.

11. The method of claim 9 of validating execution of a software program further comprising:

terminating execution of the software program if the control value indicates the software program is invalid.

12. The method of claim 1 further comprising sending control values from the smart card to the computer in response to verifying the information received from the computer, wherein the frequency with which the computer sends information to the smart card depends upon the control values.

13. The method of claim 1 wherein sending information comprises sending information identifying memory addresses in the computer in which specified data is stored.

14. The method of claim 13 wherein verifying comprises verifying whether the memory addresses are permissible memory locations for the specified data.

15. The method of claim 1 wherein sending information to the smart card occurs multiple times during execution of the software program in a particular order, and wherein verifying comprises verifying that the order in which the multiple occurrences takes place is correct.

16. The method of claim 1 wherein the software program comprises a plurality of routines each of which routines is called for during execution of the software program, and wherein verifying comprises determining whether a frequency with which each of the routines is called is within acceptable ranges.

17. A method of validating execution of a software program comprising:
   executing the software program on a computer;
   sending information from the computer to a smart card during execution of the software program; and
   verifying in the smart card that a duration of time between successive calls to the smart card by the computer during execution of the software program is within acceptable ranges; and
   sending a control value from the smart card to the computer in response to verifying the information received from the computer and indicative of whether the software program is valid or invalid; and
   continuing execution of the software program if the control value indicates that the software program is valid.

18. The method of claim 1 of validating execution of a software program further comprising:
   terminating execution of the software program if the control value indicates the software program further.

19. The method of claim 1 wherein verifying comprises performing a plurality of verification tests in response to the information received from the computer, and wherein storing a signal comprises storing a signal indicating that the software program was not improperly altered during its execution only if all of the verification tests are satisfied.

20. The method of claim 1 further comprising retrieving from the smart card the signal indicative of whether execution of the software program is certified as valid.

21. A method of validating execution of a software program comprising:
   executing the software program on a computer;
   verifying in a smart card information received from the computer during execution of the software program is within an expected frequency;
   generating a signal by the smart card indicative of whether execution of the software program is certified as valid based on the verifying step; and
   sending control values indicating the validity or invalidity of the software program from the smart card to the computer in response to verifying the information received from the computer.

22. The method of claim 21 wherein the signal indicative of whether execution of the software program is certified as valid is generated after completion of the software program.

23. The method of claim 21 of validating exacution of a software program further comprising:
   continuing execution of the software program base on the control value.

24. A method of validating execution of a software program comprising:
   executing the software program on a computer;
   sending a control value from a smart card to the computer:
   sending information from the software program to the computer in response to the control value;
   verifying in the smart card that the information received from the computer during execution of the software program is a correct response to the control value.

25. The method of claim 24 wherein the control value determines when subsequent information will be sent from the computer to the smart card during execution of the software program.

26. A smart card for use in connection with execution of a software program by a computer, the smart card comprising:
   communication circuitry for receiving information from a location external to the smart card and for transmitting information from the smart card to the external location;
   memory which stores data and a smart card program; and
   a microcontroller configured by the smart card program to verify information received from the computer during execution of the software program and to cause a signal to be stored in the memory, wherein the signal is indicative of whether execution of the software program is certified as valid based on results of verifying the received information;
   wherein the information received from the computer comprises information identifying memory addresses in the computer in which specified data is stored, and wherein the microcontroller is further configured to verify whether the memory addresses are permissible memory locations for the specified data.

27. The smart card of claim 26 wherein the microcontroller is configured to check whether a value of a variable received from the computer during execution of the software program is accurate.

28. The smart card of claim 26 wherein the microcontroller is configured to check whether a value of a variable received from the computer during execution of the software program falls within a prescribed range.

29. The smart card of claim 26 wherein the signal stored in the memory indicates that the software program was not altered in an unauthorized manner prior to or during execution of the software program.

30. The smart card of claim 26 wherein the microcontroller is further configured to send a control value to the computer.

31. The smart card of claim 30 wherein the microcontroller is configured to determine whether the software program responds correctly to the control value.

32. The smart card of claim 26 wherein the microcontroller is configured to perform a plurality of verification tests in response to the information received from the computer, and wherein the microcontroller is further configured to cause a signal indicating that the software program was not improperly altered during its execution to be stored in the memory only if all of the verification tests are satisfied.

33. The smart card of claim 26 wherein the microcontroller is further configured to cause a signal indicative of whether execution of the software program is certified as valid to be generated in response to a query generated externally to the smart card.

34. The smart card of claim 26 wherein the microcontroller is further configured to cause information indicative of the number of times the software program has been executed to be stored in the memory.

35. The smart card of claim 26 wherein the software program comprises a plurality of routines, and wherein the microcontroller is further configured to cause information indicative of the frequency with which each of the routines was called during execution of the software program to be stored in the memory.

36. A smart card for use in connection with execution of a software program by a computer, the smart card comprising:
   communication circuitry for receiving information from a location external to the smart card and for transmitting information from the smart card to the external location;

memory which stores data and a smart card program; and a microcontroller configured by the smart card program to verify information received from the computer during execution of the software program and to cause a signal to be stored in the memory, wherein the signal is indicative of whether execution of the software program is certified as valid based on results of verifying the received information;

wherein the information received from the computer comprises a plurality of routines each of which routines is called by the software program during execution of the software program, and wherein the microcontroller is further configured to determine whether a frequency with which each of the routines was called is within acceptable ranges.

37. A smart card for use in connection with execution of a software program by a computer, the smart card comprising:

communication circuitry for receiving information from a location external to the smart card and for transmitting information from the smart card to the external location;

memory which stores data and a smart card program; and a microcontroller configured by the smart card program to verify information received from the computer during execution of the software program and to cause a signal to be stored in the memory wherein the signal is indicative of whether execution of the software program is certified as valid based on results of verifying the received information;

wherein the microcontroller is further configured to determine whether a duration of time between successive calls to the smart card by the computer during execution of the software program is within acceptable ranges.

38. A software package for use on a computer system having a computer readable medium which stores a software program for execution by a computer and a smart card having communication circuitry for receiving information from a location external to the smart card and for transmitting information from the smart card to the external location, memory which stores data and a smart card program, and a microcontroller, the software package comprising: logic to cause the smart card program to verify information received from the computer during execution of the software program and to cause a signal to be stored in the memory, wherein the signal is indicative of whether execution of the software program is certified as valid based on results of verifying the received information;

wherein the information received from the computer comprises information identifying memory addresses in the computer in which specified data is stored, and wherein the microcontroller is further configured to verify whether the memory addresses are permissible memory locations for the specified data.

39. The software package of claim 38 further comprising logic to cause the microcontroller to check whether a value of a variable received from the computer during execution of the software program is accurate.

40. The software package of claim 39 wherein the signal stored in the memory indicates that the software program was not altered in an unauthorized manner prior to or during execution of the software program.

41. The software package of claim 38 further comprising logic to cause the microcontroller to check whether a value of a variable received from the computer during execution of the software program falls within a prescribed range.

42. The software package of claim 38 further comprising logic to cause the microcontroller to send a control value to the computer.

43. The software package of claim 42 further comprising logic to cause the microcontroller to determine whether the software program responds correctly to the control value.

44. The software package of claim 38 wherein the information received from the computer comprises a plurality of routines each of which routines is called by the software program during execution of the software program, and further comprising logic to cause the microcontroller to determine whether a frequency with which each of the routines was called is within acceptable ranges.

45. A software package for use on a computer system having a computer readable medium which stores a software program for execution by a computer, and a smart card having communication circuitry for receiving information from a location external to the smart card and for transmitting information from the smart card to the external location, memory which stores data and a smart card program, and a microcontroller, the software package comprising:

logic to cause the microcontroller to verify information received from the computer during execution of the software program and to cause a signal to be stored in the memory, wherein the signal is indicative of whether execution of the software program is certified as valid based on results of verifying the received information; and logic to cause the microcontroller to determine whether a duration of time between successive calls to the smart card by the computer during execution of the software program is within acceptable ranges.

46. The software package of claim 38 further comprising logic to cause the microcontroller to perform a plurality of verification tests in response to the information received from the computer, and logic to cause the microcontroller to cause a signal indicating that the software program was not improperly altered during its execution to be stored in the memory only if all of the verification tests are satisfied.

47. The software package of claim 38 further comprising logic to cause the microcontroller to cause a signal indicative of whether execution of the software program is certified as valid to be generated in response to a query generated externally to the smart card.

48. The software package of claim 38 further comprising logic to cause the microcontroller to cause information indicative of the number of times the software program has been executed to be stored in the memory.

49. The software package of claim 38 wherein the software program comprises a plurality of routines, and wherein the software package further comprises logic to cause the microcontroller to cause information indicative of the frequency with which each of the routines was called during execution of the software program to be stored in the memory.

* * * * *